United States Patent [19]

Condorodis

[11] Patent Number: 5,735,396
[45] Date of Patent: Apr. 7, 1998

[54] COMPACT DISC STORAGE CONTAINER

[76] Inventor: George P. Condorodis, 7010 NW. 38th Manor, Coral Springs, Fla. 33605

[21] Appl. No.: 326,844

[22] Filed: Oct. 21, 1994

[51] Int. Cl.⁶ ................................. B65D 85/57
[52] U.S. Cl. ........................ 206/308.1; 206/313
[58] Field of Search .................. 206/232, 307.1, 206/308.1, 308.3, 310–313

[56] References Cited

U.S. PATENT DOCUMENTS

| | | | |
|---|---|---|---|
| 2,439,863 | 4/1948 | Segal | 206/311 |
| 2,473,333 | 6/1949 | Geis et al. | 206/311 |
| 2,881,913 | 4/1959 | Kursh | 206/313 |
| 3,077,263 | 2/1963 | Froehlig | 206/313 |
| 3,464,135 | 9/1969 | Eidinger | 206/232 |
| 3,688,898 | 9/1972 | Stanton | 206/311 |
| 4,850,731 | 7/1989 | Youngs | 206/313 |
| 5,154,291 | 10/1992 | Sur | 206/308.1 |
| 5,207,717 | 5/1993 | Manning | 206/312 |

FOREIGN PATENT DOCUMENTS

664016  1/1952  United Kingdom ............. 206/313

*Primary Examiner*—Jimmy G. Foster
*Attorney, Agent, or Firm*—Paul S. Rooy

[57] ABSTRACT

A compact disc storage container comprising a front cover, a center plate, and a rear cover, mutually attached perimetrically. The front cover and center plate define an album cover pocket; the rear cover and center plate define a compact disc pocket. The front cover is transparent to allow an album cover enclosed in the album cover pocket to be read through the front cover. The rear cover comprises a rear cover tab attached to the rear cover at an angle, to facilitate the insertion of CDs into the compact disc pocket. The center plate incorporates a ramped post which retains a CD within the compact disc pocket. The flexible material of which the center plate is fabricated, in combination with a rear cover second cutout, permits CDs to be inserted and withdrawn from the compact disc storage container using only one hand. A rear cover liner, a center plate liner, and dust covers clean and protect CDs contained in the compact disc storage container, and prevent CDs from sticking to, or getting scratched by, the rear cover or center plate.

15 Claims, 6 Drawing Sheets

COMPACT DISC STORAGE CONTAINER

BACKGROUND OF THE INVENTION

1. Field of the Invention

This invention relates to compact disc storage containers, and in particular to a compact disc storage container incorporating non-scratching and non-sticking interior container surfaces, and means to retain the compact disc within the storage container.

2. Background of the Invention

Compact discs ("CDs") have become an important method of data storage in the area of music, as well as digital information in computer applications. Compact discs are made by digitally encoding information into a plastic disc, then applying a coating of aluminum followed by a layer of a protective sealant such as lacquer, to prevent the aluminum from being scratched off. If the aluminum layer is scratched, the integrity of information contained in the CD may be compromised, and a compact disc reader may be unable to read the information contained in the compact disc. Scratched music CDs tend to skip, that is, to repeat small sections of the musical passage indefinitely. Therefore, compact disc storage containers must be designed to not scratch compact discs, and to securely retain compact discs within the container. Car CD installations are becoming increasingly common. Consequently, one-handed CD storage container operation is desirable, so that a driver may remove a CD from its container without taking both hands off the steering wheel.

Existing Designs

One prevalent design is known as the jewel box. This three-piece design is fabricated of hard plastic, and incorporates a plurality of gripping fingers to retain a compact disc ("CD") in its interior. Although the jewel box does protect the CD contained in it, it is expensive (due to its three-piece construction), fragile, and difficult to open. In addition, even using two hands, the CD contained in the jewel box is difficult to remove, and may be bent in the removal process, thereby breaking the CD or decreasing its life. Finally, jewel boxes are thick, averaging 2-3 times the thickness of a CD, thereby wasting CD shelf space.

U.S. Pat. No. 4,850,731 was granted Youngs for a CD storage container with a non-scratching surface, comprising a clear plastic flapped envelope having one non-scratch interior side. While this design cost less than the conventional jewel box, it still required two-handed operation (one hand to hold the flap open and a second hand to insert or remove the CD), and only one interior side was coated with non-scratching fabric. Therefore, this design suffered from the disadvantages that any CD inserted backwards ran the risk of scratches, and one-handed operation was difficult. Additionally, in the presence of high temperatures, CDs tend to stick to plastic. Therefore, the design taught by '731 would suffer from the problem that compact discs would tend to stick inside the CD storage container left inside a car on a hot day.

SUMMARY OF THE INVENTION

Accordingly, it is an object of the present invention to provide a compact disc storage container which will not scratch CDs contained in it, regardless of which CD side is up. Design features allowing this object to be accomplished include a rear cover liner and a center plate liner. Advantages associated with the accomplishment of this object include prevention of scratches on contained CDs, prevention of the associated loss of data encoded in CDs, and prevention of skipping in music CDs.

It is another object of the present invention to provide a compact disc storage container which securely retains any compact disc contained in it. Design features allowing this object to be accomplished include a rear cover liner cutout and a ramped post. Benefits associated with the accomplishment of this object include CD protection and increased CD life.

It is still another object of the present invention to provide a compact disc storage container which permits a CD to be inserted and removed using only one hand. Design features allowing this object to be accomplished include a rear cover liner cutout, flexible dust covers, and a ramped post. Benefits associated with the accomplishment of this object include ease of use and the fact that a driver may remove a CD from its container without taking both hands off the steering wheel.

It is an object of the present invention to provide a compact disc storage container which will not stick to CDs contained in it. Design features allowing this object to be accomplished include a rear cover liner and a center plate liner. Advantages associated with the accomplishment of this object include prevention of damage to contained CDs and ease of operation, including one-handed operation.

It is another object of this invention to provide a compact disc storage container which is strong and durable. Design features enabling the accomplishment of this object include a rear cover, rear cover spacer, center plate front cover spacer and front cover which are manufactured of tough, somewhat flexible material. Advantages associated with the realization of this object include a longer lasting compact disc storage container, along with associated cost benefits.

It is still another object of this invention to provide a compact disc storage container which is economical and easily affordable to the consumer. Design features allowing this object to be achieved include the use of inexpensive, off-the-shelf materials. Benefits associated with reaching this objective include increased affordability and accessibility to the consumer.

BRIEF DESCRIPTION OF THE DRAWINGS

The invention, together with the other objects, features, aspects and advantages thereof will be more clearly understood from the following in conjunction with the accompanying drawings.

Six sheets of drawings are provided. Sheet one contains FIGS. 1 and 2. Sheet two contains FIG. 3. Sheet three contains FIGS. 4 and 5. Sheet four contains FIG. 6 and 6A. Sheet five contains FIGS. 7 and 8. Sheet six contains FIG. 9.

DETAILED DESCRIPTION OF THE PREFERRED EMBODIMENT

Figure 1:
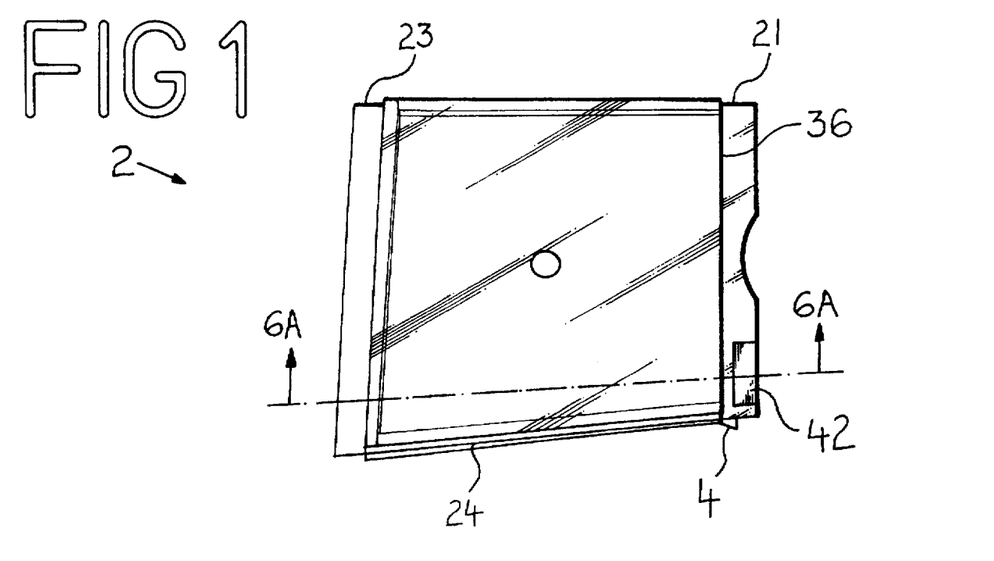
FIG. 1 is a front isometric view of a compact disc storage container.

FIG. 1 is a front isometric view of compact disc storage container 2. Front cover 36 and rear cover 4 are perimetrically attached along three sides to center plate 24. Center plate 24 comprises center plate first tab 21 and center plate second tab 23, which extend beyond front cover 36 and rear cover 4. Label 42 is attached to center plate first tab 21. The compact disc storage container 2 contents may be identified on label 42. Alternately, all of center plate first tab 21 may be made of material on which inscriptions may be made.

Figure 2:
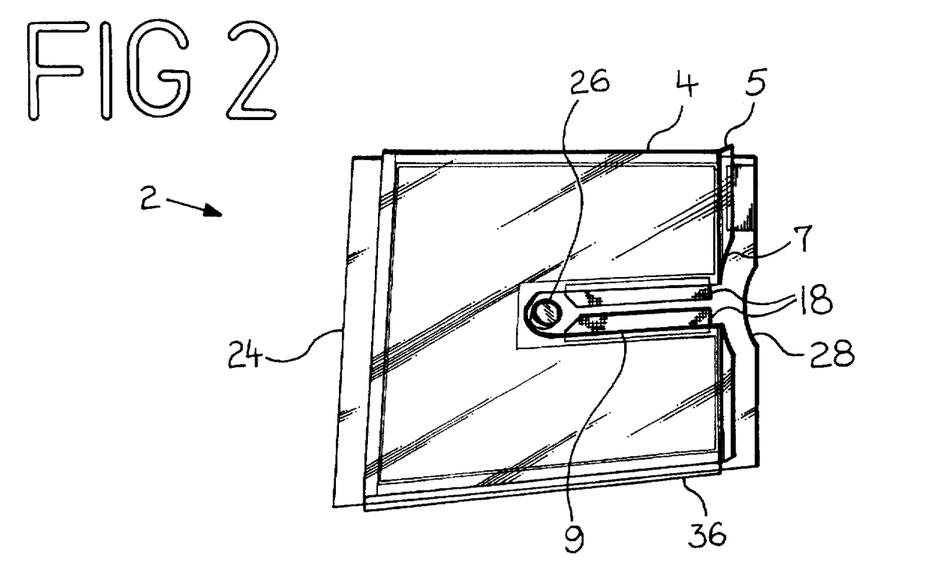
FIG. 2 is a rear isometric view of a compact disc storage container.

FIG. 2 is a rear isometric view of compact disc storage container 2. Front cover 36 and rear cover 4 are perimetrically attached along three sides to center plate 24. Center plate 24 comprises center plate cutout 28 and ramped post 26, which is made of a cylindrical post 25 terminating in a ramped face 27 (see also FIG. 3). Ramped face 27 extends from the plane of center plate 24 at a point of post 25 closest center plate cutout 28, to a distance approximately equal to the thickness of a compact disc at a point of post 25 farthest away from center plate cutout 28. Post 25 is sized to loosely fit into the center hole of a compact disc.

Rear cover 4 comprises rear cover tab 5, rear cover first cutout 7 and rear cover second cutout 9. Rear cover tab 5 is rigidly attached to rear cover 4, and defines an angle of approximately 30 degrees with center plate 24. Rear cover first cutout 7 is centrally disposed in rear cover tab 5, and is arcuate in shape. Rear cover second cutout 9 extends from the center of rear cover first cutout 7 to the center of rear cover 4, and is sized to admit a human adult fingertip. The end of rear cover second cutout 9 opposite rear cover first cutout 7 is sized to admit ramped post 26. Ramped post 26 extends into the end of rear cover second cutout 9 opposite rear cover first cutout 7. Dust covers 18 are marginally attached to opposite sides of rear cover second cutout 9, and are made of soft, flexible fabric possessing sufficient memory to return to a position roughly coplanar with rear cover 4 after a compact disc has been inserted or removed from compact disc storage container 2.

Figure 3:
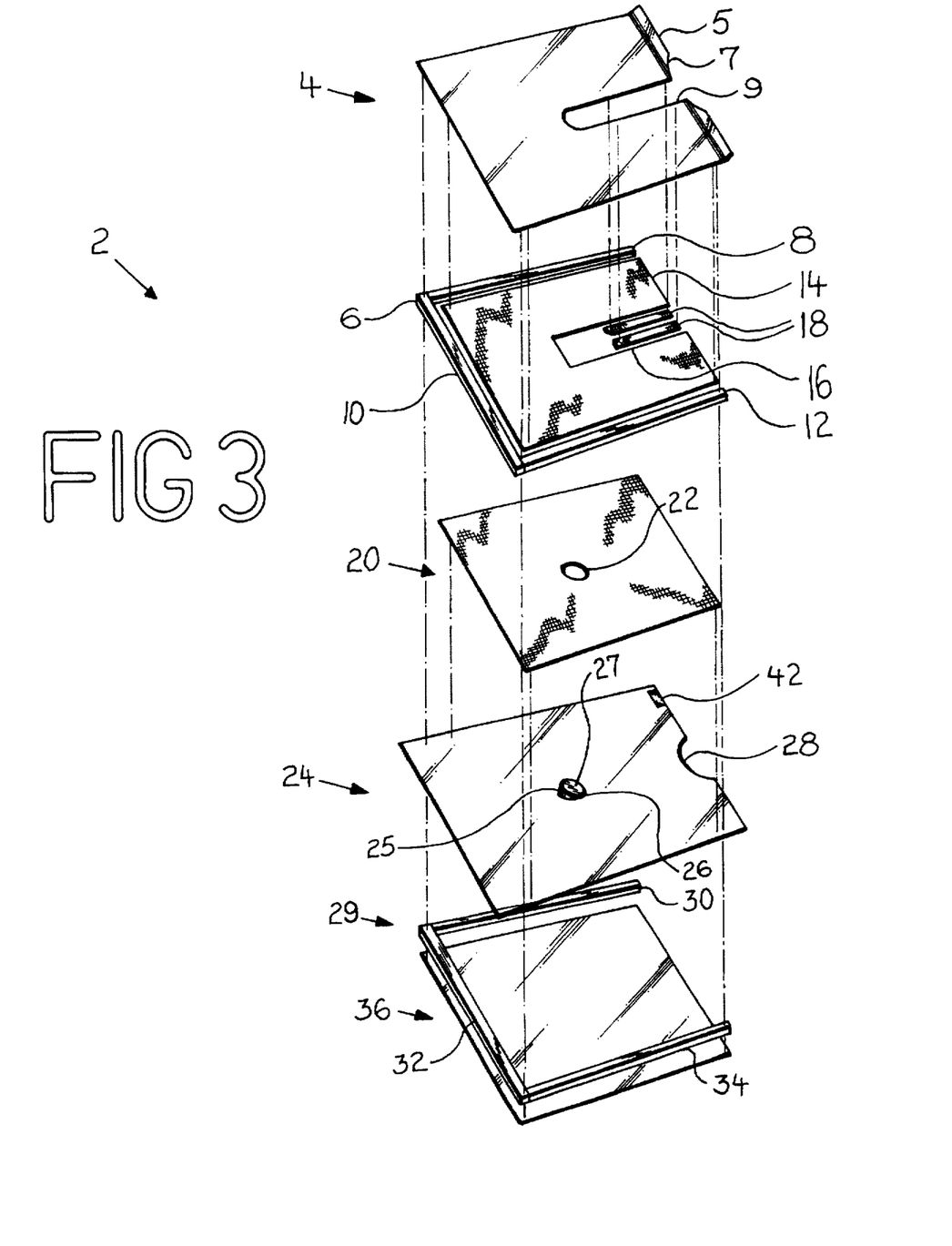
FIG. 3 is an exploded rear quarter isometric view of a compact disc storage container.
Figure 4:
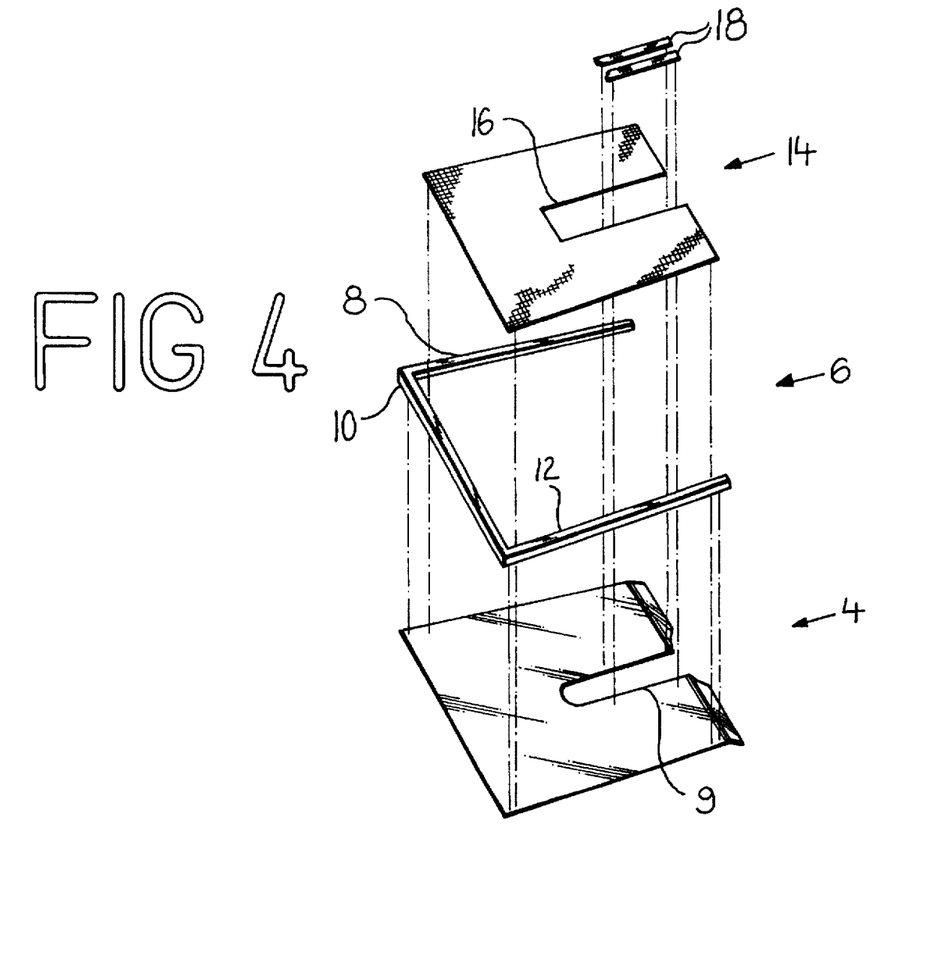
FIG. 4 is an exploded front quarter isometric view of a rear cover, rear cover liner, rear cover spacer and dust covers.
Figure 6:
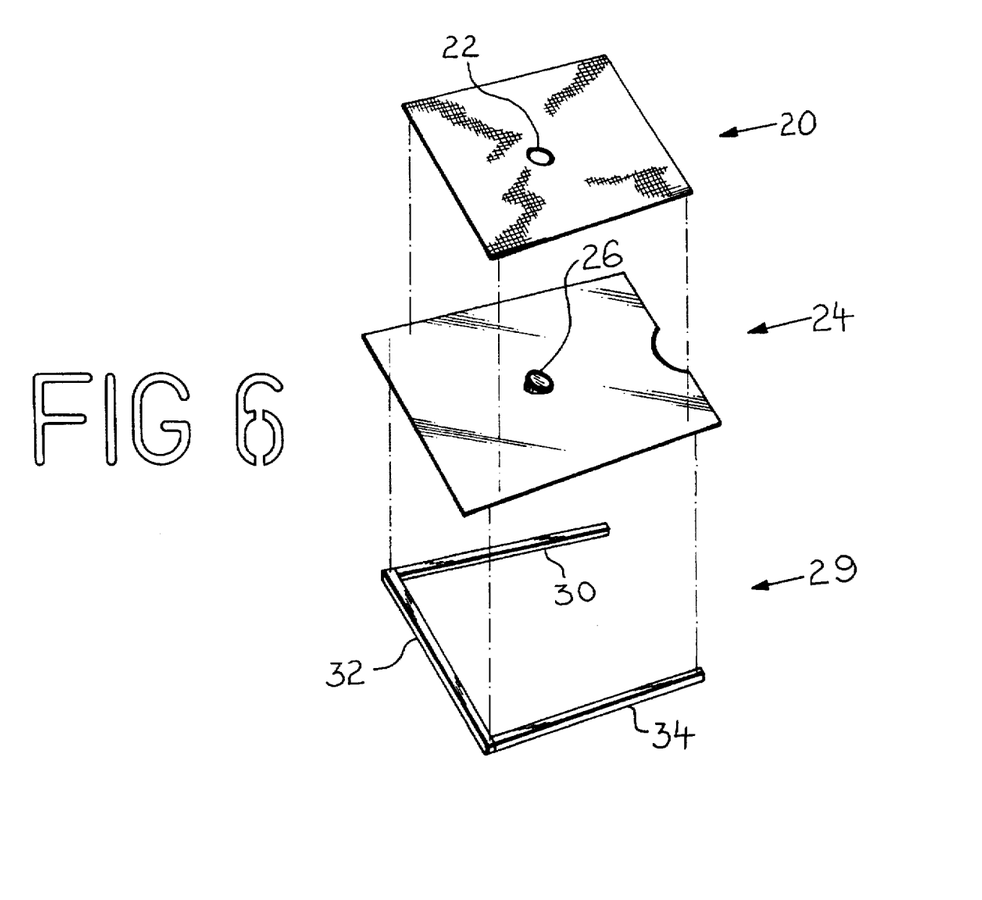
FIG. 6 is an exploded rear quarter isometric view of a center plate liner, center plate and front cover spacer.
Figure 6A:
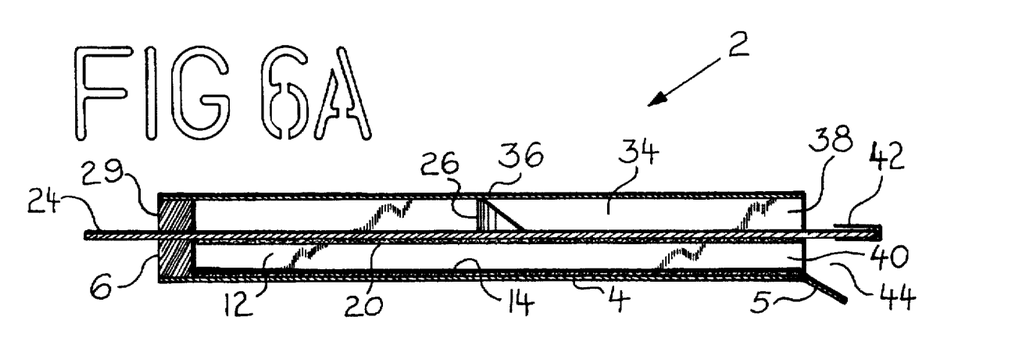
FIG. 6A is a bottom cross-sectional view of a compact disc storage container taken at section 6A—6A of FIG. 1.

FIG. 3 is an exploded rear quarter isometric view of compact disc storage container 2. FIG. 4 is an exploded front quarter isometric view of rear cover 4, rear cover liner 14, rear cover spacer 6 and dust covers 18, and FIG. 6 is an exploded rear quarter isometric view of center plate liner 20, center plate 24 and front cover spacer 29. FIG. 6A is a bottom cross-sectional view of compact disc storage container 2 taken at section 6A—6A of FIG. 1.

Rear cover liner 14 comprises rear cover liner cutout 16, which is sized to exceed the perimeter of rear cover second cutout 9. Rear cover liner 14 is attached to rear cover 4, and dust covers 18 are attached along rear cover second cutout 9 as described previously. Center plate liner 20 contains center plate liner aperture 22, and is attached to center plate 24. Ramped post 26 extends through center plate liner aperture 22. Rear cover spacer 6 is attached along the perimeter of rear cover 4 and center plate 24, thereby defining compact disc pocket 40 (see FIG. 6A). Rear cover tab 5 is disposed at an approximately 30 degree angle with respect to rear cover 4, thereby forming funnel opening 44. A compact disc being inserted into compact disc pocket 40 passes through funnel opening 44. Funnel opening 44 serves to guide a compact disc into compact disc pocket 40, thereby facilitating one-handed operation of compact disc storage container 2.

Front cover spacer 29 is attached along the perimeter of front cover 36 and center plate 24, thereby defining album cover pocket 38 (see FIG. 6A). Rear cover spacer 6 is made up of rear cover spacer first leg 8, rear cover second leg 10, and rear cover spacer third leg 12. Front cover spacer 29 is made up of front cover spacer first leg 30, front cover spacer second leg 32, and front cover spacer third leg 34.

Figure 5:
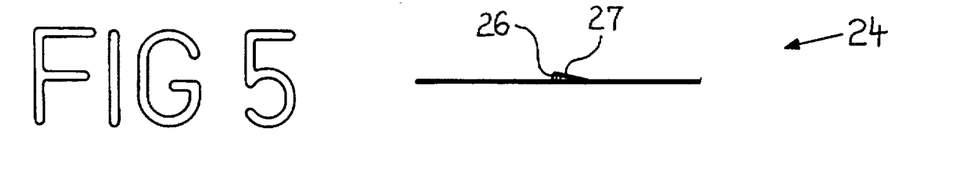
FIG. 5 is a side view of a center plate.

FIG. 5 is a side view of center plate 24. Ramped post 26 is centrally disposed in center plate 24. Center plate 24 is manufactured of moderately stiff material which may be elastically deformed with light finger pressure, and which possesses sufficient memory to return to its original position after the light finger pressure is removed. Thus, light finger pressure on ramped face 27 normal to center plate 24 will depress ramped post 26 a distance (with respect to the perimeter of center plate 24) approximately equal to the thickness of a compact disc; when the light finger pressure is removed, ramped post 26 will return to its original position.

Figure 7:
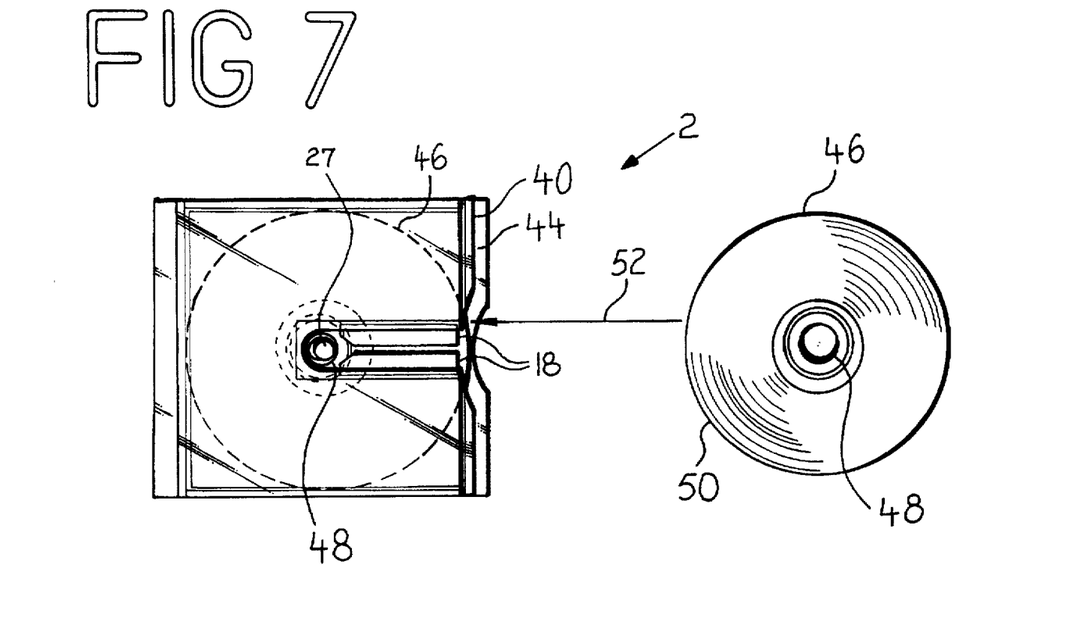
FIG. 7 is a rear view of a compact disc storage container and of a compact disc, depicting how the compact disc is inserted into a compact disc pocket.

FIG. 7 is a rear view of compact disc storage container 2 and of compact disc 46, depicting the one-handed operation of inserting compact disc 46 into compact disc pocket 40 as indicated by arrow 52. Compact disc outer edge 50 is inserted into compact disc pocket 40 through funnel opening 44. Compact disc outer edge 50 then slides over ramped face 27, thereby displacing ramped post 26 sufficiently to allow compact disc 46 to be completely inserted into compact disc pocket 40. Ramped post 26 snaps into compact disc center hole 48, thereby retaining compact disc 46 within compact disc pocket 40. A fully inserted compact disc 46 is shown in dashed lines. Rear cover liner 14 and center plate liner 20 clean compact disc 40, and prevent compact disc 40 from becoming scratched or stuck to rear cover 4 or center plate 24. Ramped post 26 is manufactured of smooth, non-abrasive material, to prevent compact disc 46 from becoming scratched during the insertion and removal operations.

Compact disc 46 may be easily removed from compact disc storage container 2 using only one hand. The operator uses a finger to depress ramped post 26, thereby disengaging compact disc center hole 48 from ramped post 26, then engages the same finger with compact disc center hole 48 to slide compact disc 46 out of compact disc pocket 40 in one smooth motion. Dust covers 18 yield to afford the operator's finger passage during the removal operation, then return to their rest position depicted in FIG. 7.

Figure 8:
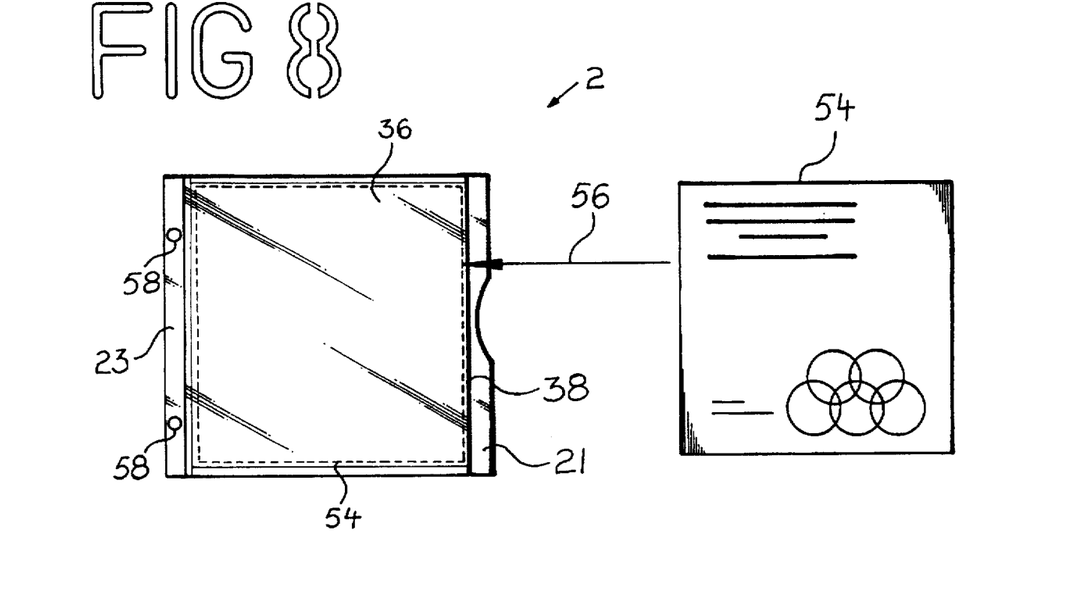
FIG. 8 is a front view of a compact disc storage container and of an album cover, depicting how the album cover is inserted into an album cover pocket.

FIG. 8 is a front view of compact disc storage container 2 and of album cover 54, depicting how album cover 54 is inserted into album cover pocket 38. When purchased, musical compact discs are generally accompanied by an album cover 54, which identifies the author and contents of the CD. Album covers 54 are generally square, and the side dimensions are approximately equal to the diameter of compact disc 46. Album cover 54 may be inserted into album cover pocket 38 as indicated by arrow 56. Since front cover 36 is fabricated of transparent material, the identifying markings on album cover 54 may be read through front cover 36.

Figure 9:
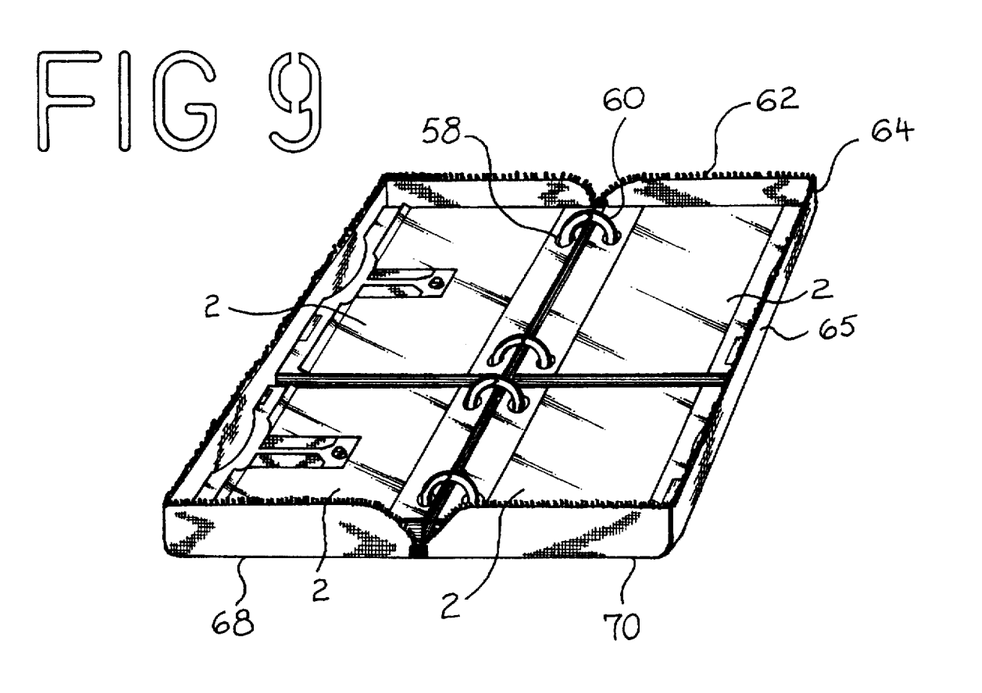
FIG. 9 is a front isometric view of a ringed binder containing a plurality of compact disc storage containers.

FIG. 8 depicts an alternate embodiment of compact disc storage container 2 incorporating center plate second tab apertures 58 sized to freely admit standard snap rings 60 (see FIG. 9) FIG. 9 depicts a plurality of compact disc storage containers 2 constrained within ringed binder 64 by means of snap rings 60 through center plate second tab apertures 58.

FIG. 9 is a front isometric view of ringed binder 64 containing a plurality of compact disc storage containers 2. Ringed binder 64 comprises ringed binder front cover 68 rotatably attached to ringed binder rear cover 70 and snap rings 60. Each compact disc storage container 2 is retained within ringed binder 64 by means a snap ring 60 through each center plate second tab aperture 58. Snap rings 60 are standard binder snap rings that are spring-loaded in the open and closed positions. Ringed binder sides 65 are attached to ringed binder front cover 68 and ringed binder rear cover 70. Ringed binder 64 may be constrained in the closed position by means of zipper 62 attached to ringed binder sides 65.

Rear cover 5, center plate 24 and front cover 36 may be manufactured of stiff, semi-flexible transparent plastic or other appropriate material. Ramped post 26 may be integrally formed with, and made of the same material, as center plate 24. Rear cover liner 14 and center plate liner 20 may be made of soft, non-abrasive cloth which cleans CDs and prevents CDs from getting scratched, or other appropriate material. Dust covers 18 may be manufactured of non-abrasive, semi-stiff fabric, or other appropriate material. Rear cover spacer 6 and front cover spacer 29 may be fabricated of plastic or other appropriate material.

Ringed binder front cover 68 and ringed binder rear cover 70 may be made of cardboard, fiberboard or other appropriate material, and then covered with nylon cloth, leather, or other appropriate material. Ringed binder sides 65 are fabricated of nylon cloth, leather, or other appropriate material. Zipper 62 and snap rings 60 are standard, off-the-shelf items.

While a preferred embodiment of the invention has been illustrated herein, it is to be understood that changes and variations may be made by those skilled in the art without departing from the spirit of the appending claims.

DRAWING ITEM INDEX 2 compact disc storage container
4 rear cover
5 rear cover tab
6 rear cover spacer
7 rear cover first cutout
8 rear cover spacer first leg
9 rear cover second cutout
10 rear cover spacer second leg
12 rear cover spacer third leg
14 rear cover liner
16 rear cover liner cutout
18 dust cover
20 center plate liner
21 center plate first tab
22 center plate liner aperture
23 center plate second tab
24 center plate
25 post
26 ramped post
27 ramped face
28 center plate cutout
29 front cover spacer
30 front cover spacer first leg
32 front cover spacer second leg
34 front cover spacer third leg
36 front cover
38 album cover pocket
40 compact disc pocket
42 label
44 funnel opening
46 compact disc
48 compact disc center hole
50 compact disc outer edge
52 arrow
54 CD album cover
56 arrow
58 center plate second tab aperture
60 snap ring
62 zipper
64 ringed binder
65 ringed binder side
68 ringed binder front cover
70 ringed binder rear cover

I claim:

1. A compact disc storage container comprising:
    a center plate with a center plate liner attached;
    a front cover perimetrically attached to said center plate thereby defining an album cover pocket;
    a rear cover perimetrically attached to said center plate thereby defining a compact disc pocket;
    a rear cover tab rigidly attached to said rear cover and extending away from said center plate at an angle of approximately 30 degrees, thereby forming a funnel opening leading into said compact disc pocket;
    a rear cover liner attached to said rear cover;
    a rear cover second cutout extending from said rear cover tab to a center of said rear cover;
    a rear cover liner cutout surrounding said rear cover second cutout; and
    dust covers attached to said rear cover at said rear cover second cutout, said dust covers being disposed substantially coplanar with said rear cover and extending into said rear cover second cutout.

2. A compact disc storage container comprising a rear cover, a center plate and a front cover perimetrically attached, said rear cover and said center plate defining a compact disc pocket, said center plate and said front cover defining an album cover pocket, said center plate comprising a ramped post sized to fit loosely through a compact disc center hole, whereby a compact disc may be retained within said compact disc pocket.

3. The compact disc storage container of claim 2 wherein said ramped post comprises a post and a ramped face, said ramped face extending from a plane of said center plate to a distance from said center plate approximately equal to the thickness of a compact disc.

4. The compact disc storage container of claim 3 wherein said rear cover comprises a rear cover tab rigidly attached to said rear cover and extending away from said center plate at an angle of approximately 30 degrees, thereby forming a funnel opening leading into said compact disc pocket.

5. The compact disc storage container of claim 4 further comprising a rear cover liner attached to said rear cover and a center plate liner attached to said center plate, said center plate liner comprising a center plate liner aperture, said ramped post extending through said center plate liner aperture.

6. The compact disc storage container of claim 5 wherein said rear cover further comprises a rear cover second cutout extending from said rear cover tab to a center of said rear cover, dust covers attached to said rear cover at said rear cover second cutout, and said rear cover liner further comprises a rear cover liner cutout surrounding said rear cover second cutout, said dust covers being disposed substantially coplanar with said rear cover and extending into said rear cover second cutout, said ramped post extending through said rear cover liner cutout and into said rear cover second cutout.

7. The compact disc storage container of claim 6 further comprising a rear cover spacer attached perimetrically between said rear cover and said center plate, and a front cover spacer attached perimetrically between said front cover and said center plate.

8. The compact disc storage container of claim 7 wherein said center plate further comprises a center plate first tab and a center plate second tab.

9. The compact disc storage container of claim 8 further comprising a label suitable for writing on attached to said center plate first tab.

10. The compact disc storage container of claim 8 wherein said center plate first tab is suitable for writing on.

11. The compact disc storage container of claim 8 further comprising at least one center plate second tab aperture disposed in said center plate second tab.

12. The compact disc storage container of claim 8 wherein said rear cover further comprises a rear cover first cutout communicating with said rear cover second cutout, said center plate first tab comprises a center plate cutout, and said front cover is transparent.

13. A compact disc storage container comprising:

a rear cover comprising a rear cover tab, a rear cover first cutout, and a rear cover second cutout, said rear cover tab being rigidly attached to said rear cover at an angle of approximately 30 degrees relative to a plane of said rear cover, said rear cover second cutout communicating with said rear cover first cutout, said rear cover second cutout extending from said rear cover first cutout towards a center of said rear cover;

a rear cover liner attached to said rear cover, said rear cover liner comprising a rear cover liner cutout surrounding said rear cover second cutout;

dust covers attached to said rear cover at said rear cover second cutout, said dust covers being disposed coplanar with said rear cover and extending into said rear cover second cutout;

a center plate perimetrically attached to said rear cover, said center plate comprising a ramped post sized to fit loosely through a compact disc center hole, said ramped post extending through said rear cover liner aperture and into said rear cover second cutout;

a center plate liner comprising a center plate liner aperture attached to said center plate, said ramped post extending through said center plate liner aperture; and a front cover perimetrically attached to said center plate.

14. The compact disc storage container of claim 13 further comprising a rear cover spacer attached perimetrically between said rear cover and said center plate, a front cover spacer attached perimetrically between said front cover and said center plate, and at least one center plate second tab aperture in said center plate.

15. At least one compact disc storage container of claim 13 in combination with a ringed binder, said ringed binder comprising:

a ringed binder front cover rotatably attached to a ringed binder rear cover and to at least one snap ring, each said snap ring being engaged with one said center plate second tab aperture;

ringed binder sides attached to said ringed binder front cover and to said ringed binder rear cover; and a zipper attached to said ringed binder sides whereby said ringed binder may be constrained in a closed position.

* * * * *